United States Patent
Ishizu

[19]

[11] Patent Number: 5,991,682
[45] Date of Patent: Nov. 23, 1999

[54] APPARATUS AND METHOD FOR CONTROLLING DRIVING FORCE DERIVED FROM INTERNAL COMBUSTION ENGINE TO ROAD WHEEL OF AUTOMOTIVE VEHICLE

[75] Inventor: Takeshi Ishizu, Zama, Japan

[73] Assignee: Nissan Motor Co., Ltd., Yokohama, Japan

[21] Appl. No.: 08/802,109

[22] Filed: Feb. 19, 1997

[30] Foreign Application Priority Data

Feb. 21, 1996 [JP] Japan .................................. 8-034071

[51] Int. Cl.⁶ .................................................. G05D 29/00
[52] U.S. Cl. .............................. 701/84; 701/85; 701/86; 701/87; 701/90; 477/48; 477/34
[58] Field of Search .................................. 701/84, 51–54, 701/85–87, 89, 90; 477/34, 42, 43, 48

[56] References Cited

U.S. PATENT DOCUMENTS

| 4,515,040 | 5/1985 | Takeuchi et al. ........................ 701/54 |
| 4,539,643 | 9/1985 | Suzuki et al. .......................... 701/54 |
| 5,636,909 | 6/1997 | Hirao et al. ............................ 701/84 |

FOREIGN PATENT DOCUMENTS 6-8756  1/1994  Japan.

*Primary Examiner*—William A. Cuchlinski, Jr.
*Assistant Examiner*—Yonel Beaulieu
*Attorney, Agent, or Firm*—Foley & Lardner

[57] ABSTRACT

In apparatus and method for controlling a driving force for an automotive vehicle having an internal combustion engine, a slip condition of a driven road wheel is detected, an opening angle of an engine throttle valve so as to control the slip condition of the driven road wheel to a predetermined condition is adjusted, a target opening angle of the throttle valve according to the detected slip condition is derived, the opening angle of the throttle valve is determined, a steady state deviation of an output of the engine developed between the target opening angle of the throttle valve and the actually detected opening angle thereof is derived, and the derived steady state deviation is compensated using another driving force reducing control unit such as an engine control unit used for, for example, cutting off a fuel supply to a determined number of engine cylinders.

13 Claims, 7 Drawing Sheets

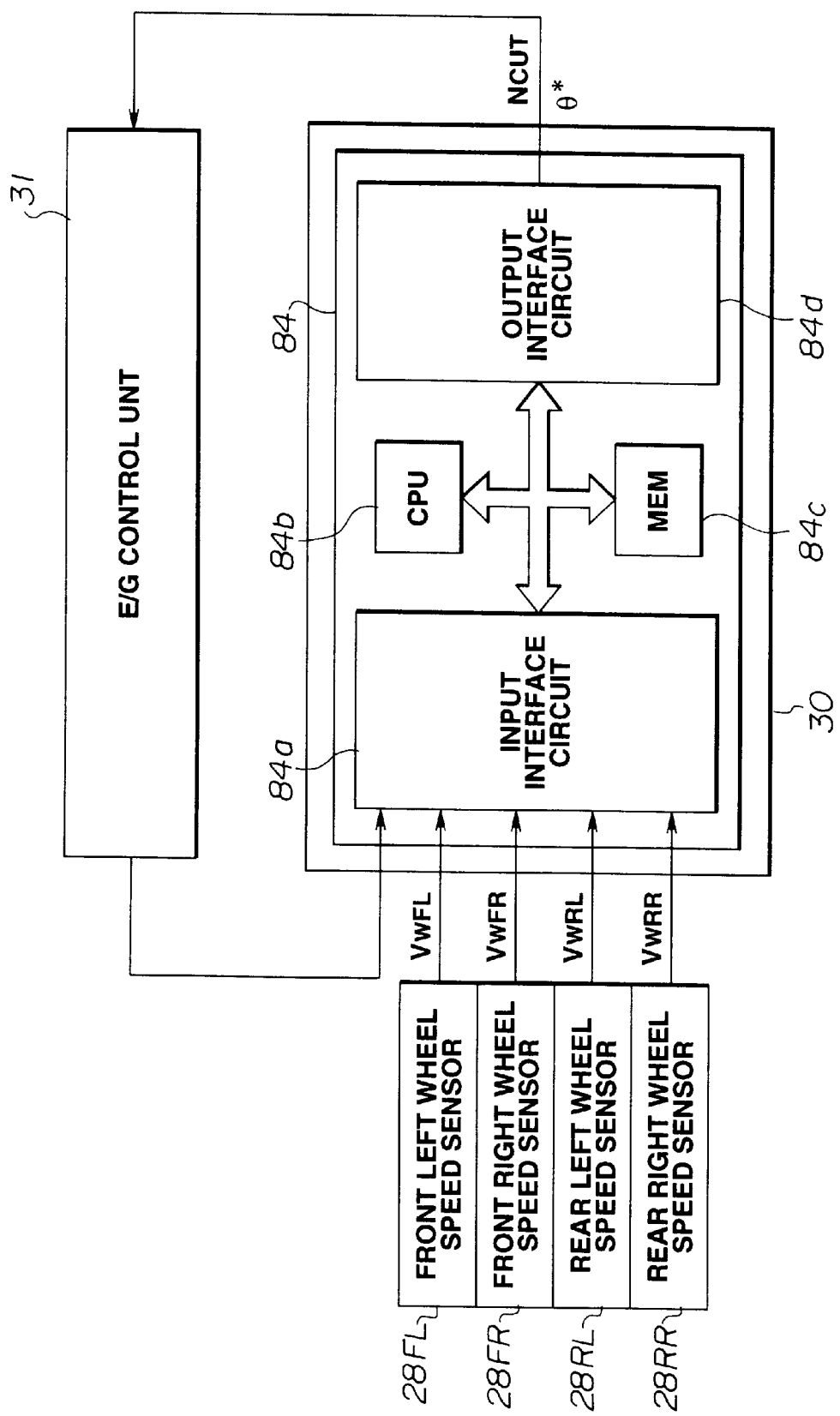

APPARATUS AND METHOD FOR CONTROLLING DRIVING FORCE DERIVED FROM INTERNAL COMBUSTION ENGINE TO ROAD WHEEL OF AUTOMOTIVE VEHICLE

BACKGROUND OF THE INVENTION

The present invention relates to an apparatus and method for controlling a driving force derived from an internal combustion engine to driven wheels of an automotive vehicle, especially related to the vehicular driving force controlling apparatus and method in which an intake air quantity to the engine is adjusted and a fuel supply to the engine is cut off or reduced so as to control an output of the engine, thus enabling the control of the driving force over each driven road wheel.

When a vehicular driver depresses deeply an accelerator pedal of the vehicle to accelerate the vehicle, such as a rear wheel driven road wheel vehicle, two driven road wheels slip largely than required so that a sufficient acceleration characteristic and a sufficient steering stability cannot be achieved in a case where the vehicle runs on a small (a low) road frictional coefficient which is smaller or lower than the driver's image. The road frictional coefficient is herein after also called $\mu$. To avoid such an inconvenience as described above, various types of the driving force controlling apparatuses have been proposed in which a control of a driving torque transmitted to the driven wheels is carried out so that the driving force acted upon between the driven road wheels and the running road surface is in accordance with the road frictional coefficient $\mu$ so as to suppress the slips on the driven road wheels and so as to assure the acceleration characteristic: of the vehicle and running stability (steering stability) thereof.

There are a variety of objects to be controlled by the above-described driving force controlling apparatus and controlled variables thereof.

One of the driving force controlling means (or apparatuses) includes such means (or apparatuses) arranged for imparting a braking force to the driven road wheels on which a slippage occurs, specifically, for forcefully activating a wheel cylinder (s) of a braking system to control the driving force (hereinafter, also referred to as a braking force control type driving force controlling means (or apparatus). Such a braking force control type driving force controlling means as described above is superior in a responsive characteristic of the driving force control. However, whenever the slippage occurs on the driven road wheels, the wheel cylinder(s) is activated so that such a frictional body as a brake pad or braking shoe is tended to be worn out.

On the other hand, one of the driving force controlling means includes the driving force controlling means arranged for directly controlling an output of the engine mounted in the vehicle, such as controlling an opening angle of an engine throttle valve disposed within an intake air system of the engine (hereinafter, referred also to as a throttle valve opening angle control type driving force controlling means). Such a throttle valve opening angle type driving force controlling means as described above can achieve a smoother driving force control characteristic through the opening angle control of the throttle valve. However, although the throttle valve is rapidly controlled toward a close direction, a rotation inertia that the engine (or whole drive train) has causes an engine revolution speed not to rapidly be reduced. Hence, the braking force caused by an engine braking given from the engine to the driven road wheels, so-called, a back torque has a possibility of not rapidly reducing the slippage on the driven road wheels. Hence, a sufficient driving force control responsive characteristic cannot be achieved.

Hence, the driving force controlling means arranged for forcefully cutting off or reducing a supply of fuel to the engine in which a combustion state of each combustion chamber is electronically controlled so that the back torque described above can largely and speedily be achieved has been proposed.

In such a fuel cutoff type driving force controlling means as described above, the engine has a plurality of cylinders and is electronically controlled so that a fuel injection for each of the cylinders can individually and independently be controlled. In this case, a slip rate of a driven road wheel velocity (speed) with respect to a target driven road wheel velocity is derived, the number of the cylinders to be fuel supply cutoff is set according to the slip rate, i.e., a desired reduction quantity of the driving force (torque), and the fuel supply is cut off for the set numbers of the cylinders (hereinafter, also referred to as a fuel cutoff) so that the large and speedily back torque causes the suppression or elimination of the slippage on the driven road wheels.

It is noted that, in the above-described type driving force controlling means, the target driven road wheel velocity when the vehicle runs steadily at a vehicle speed higher than a certain vehicle speed is set to a non-driven road wheel speed (hereinafter, simply referred to as a non-driven road wheel velocity). In a case where the vehicle starts, in other words, where the vehicle speed is equal to or below a certain predetermined vehicle speed value, the target driven wheel velocity is set to a predetermined value previously set.

Suppose that both of, for example, the throttle valve opening angle control type driving force controlling means and the fuel supply cutoff type driving force controlling means are installed in the vehicle together in order to compensate for the mutual inconveniences. Since the throttle valve opening angle controlling means is inferior in the response characteristic of the driving force control, the fuel supply cutoff type driving force control, the fuel supply cutoff type driving force controlling means is efficiently acted upon during a start of control to reduce the driving force but thereafter the throttle valve opening angle control type driving force controlling means effectively achieves a smooth driving force characteristic.

Hence, for example, the fuel supply cutoff type driving force controlling means, the number of cylinders for the fuel supply to be cut off are, for example, set in the fuel supply cutoff type driving force controlling means from a proportional component to the slip rate and a differential component having a phase advance with respect to the proportional component. In the other throttle valve opening angle control type driving force controlling means, when a close variable of the throttle valve is, for example, set from a proportional component to the slip rate and an integral component having a phase lag with respect to the proportional component, for example, in order to effectively activate the respective characteristics of both control type driving force controlling means, the differential component of the former may be enlarged, i.e., a differential gain may be enlarged and the integral component, i. e., an integral gain may be enlarged.

In details, in a case where the vehicle runs on a low $\mu$ road surface having a low frictional coefficient state (simply referred to as a low frictional coefficient state (simply referred to as a low $\mu$) between the road surface and each road wheel such as a normal snow road or a steady-state slip occurs on the driven road wheels during a relatively smooth start and acceleration. If even in this state of the steady state slip occurrence, the fuel supply cutoff is carried out, the driving force to the driven road wheels becomes too small so that a sufficient acceleration cannot be achieved. Therefore, in the fuel supply cutoff type driving force controlling means according to the proportional-integral control form, for example, the proportional gain is to a certain degree reduced and if the slip on the driven wheels is converged to some degree, the fuel supply is not cut off or is carried out by a slight quantity and a minute adjustment of the slip rate thereafter is rested on the throttle valve opening angle control type driving force controlling means.

On the other hand, when, in the throttle valve opening angle control type driving force controlling means, both of the throttle valve whose opening angle is adjusted according to a depression of the accelerator pedal and a throttle valve whose opening angle is controlled by means of the throttle valve opening angle control type driving force controlling means are used simultaneously and both are interlocked with each other via the throttle valve, the accelerator pedal is independently moved with no intention (depressed or released) against an intention of the vehicular driver when the driving force controlling means causes the throttle valve to be opened or closed. Or in a case where both accelerator pedal and the throttle valve opening angle control type driving force controlling means are not: interlocked, it is difficult to make the opening angle of the throttle valve which has been controlled by means of the driving force controlling means coincident with the opening angle which is in accordance with a depression angle (rate) of the accelerator pedal.

Therefore, a second throttle valve whose opening angle is adjustable by means of an actuator such as a DC motor or so on (hereinafter, also referred to as a sub throttle valve) is serially and independently installed in the throttle chamber of the engine intake air system with a first throttle valve whose opening angle is adjusted by means of the accelerator pedal (hereinafter, also referred to as a main throttle valve) so that the opening angle of the sub throttle valve is controlled by means of the throttle valve opening angle control type driving force controlling means.

On the other hand, in a case where, in so-called an engine cold state (wherein a temperature of the whole engine is not raised up to a steady state and, hence, a temperature of an engine coolant is not sufficiently raised), a viscosity of an engine lubricant in the engine, i.e., the engine oil is high, a frictional loss (friction loss) of an engine revolution force is large due to the high viscosity resistance. Hence, if is necessary for the engine not to be stalled in order to increase an engine idling speed for the engine to be stopped. In a vehicle in which the combustion state of the engine is electronically controlled, the engine coolant temperature is detected, the opening angle of an idling valve or a combustion state of the engine is managed or adjusted according to -the detected engine coolant temperature so that a fuel rate or percentage in a air-fuel mixture ratio is enlarged to secure a required idling speed.

Hence, as described above, in a case where the main throttle valve and the sub throttle valve are installed together in series with each other, it is necessary to install a mechanical full close stopper on the sub throttle valve so as to provide a clearance through which the intake air flows in the intake air system in order to secure the required intake air quantity to maintain the idling speed at the engine cold state even if the sub throttle valve is at least fully closed.

It is herein defined that the opening angle of the sub throttle valve which corresponds to the clearance through which the intake air quantity passes includes the actual opening angle of the sub throttle valve.

Then, when both means play different roles such that the fuel supply is cut off by the fuel supply cut off type driving force controlling means only when the driving force control is started and thereafter opening angle control of the sub throttle valve is carried out by the throttle valve opening angle control type driving force opening angle control type driving force controlling means, a large slip occurs immediately on the driven road wheels when the vehicle starts on an extremely low $\mu$ road surface on which the frictional coefficient between the driven road wheels and road surface is extremely low such as a frozen road. To cope with the large slippage, even if the fuel supply cutoff control type driving force controlling means carried out the fuel supply cutoff, the slippage on the driven road wheels is not sufficiently decreased. In this case, the throttle valve opening angle control type driving force controlling means would output a full close command to the throttle valve (especially, the sub throttle valve).

However, the fuel supply cutoff type driving force controlling means which carries out the fuel supply cutoff to the engine only during the increase in the slippage with the differential gain increased as described above does not carry out the fuel supply cutoff or reduction by the slight quantity even if although the slippage on the driven road wheels is not increased any more, the slippage of the driven road wheels itself is not converged into a predetermined state. In addition, since the intake air is sucked into the engine even if the sub throttle valve is fully closed (actually, although the full close command is outputted, the sub throttle valve is not fully closed), a steady state deviation occurs between the engine output under a virtual sub throttle valve fully closed state used in a calculation processing and the actual engine output, It is natural that the actual engine output is larger.

Hence, the steady state deviation of the engine output, i.e., the driving force corresponding to the steady state deviation of the engine output developed between the target opening angle of the sub throttle valve and actual opening angle thereof is continued to be applied to the driven road wheels. In addition, in a case where the road surface on which the vehicle is to start is the extremely low $\mu$ road surface, the slip is further tended to be difficult to be converged.

This problem may be applied equally well to the case wherein in the driving force controlling apparatus in which both of the throttle valve opening angle control type driving force controlling means and braking force control type driving force controlling means are used simultaneously, the braking force control type driving force controlling means applies to the braking force to the driven road wheels only during an earlier stage of the vehicle start.

SUMMARY OF THE INVENTION

It is an object of the present invention to provide apparatus and method for controlling a driving force derived from an internal combustion engine to driven road wheels of an automotive vehicle in which a driving force reduction control through a fuel supply cutoff or through a braking force control on an extremely low $\mu$ road surface is continued for a time during which a steady state deviation of an engine output developed between a target opening angle of a sub throttle valve and actual opening angle thereof is compensated so that a convergence of a slippage on the driven road wheels can be achieved as early as possible.

The above-described object can be achieved by providing an apparatus for controlling a driving force derived from an internal combustion engine to at least one driven road wheel of an automotive vehicle, comprising:

a) first means for detecting a slip condition of the driven road wheel;

b) second means for adjusting an opening angle of an engine throttle valve so as to control the slip condition of the driven road wheel to a predetermined condition;

c) third means for calculating a target opening angle of the throttle valve according to the detected slip condition;

d) fourth means for detecting the opening angle of the throttle valve;

e) fifth means for deriving a steady state deviation of an output of the engine developed between the target opening angle of the throttle valve and the actually detected opening angle thereof; and g) sixth means for compensating the derived steady state deviation using another driving force reducing means.

The above-described object can also be achieved by providing a driving force controlling apparatus for an automotive vehicle having an internal combustion engine, comprising:

a first detector arranged for detecting a vehicle body speed as a predetermined target driven road wheel velocity;

a second detector arranged for detecting a driven road wheel velocity of a driven road wheel of the vehicle;

a first control unit arranged for determining a slip condition of the driven road wheel with respect to the predetermined target driven road wheel velocity;

a second control unit arranged for controlling an opening angle of a sub throttle valve installed independently of a main throttle valve in an intake air system of the engine, said main throttle valve being operable by a vehicle driver through an accelerator, in a close direction thereof according to a magnitude of a determined value of the slip condition of the driven road wheel so as to reduce an engine output, said second control unit deriving a target opening angle of said sub throttle valve according to a magnitude of the determined value of the slip condition; and a third control unit arranged for cutting off a fuel supply to one or more of the engine cylinders so as to reduce the engine output, said third control unit setting a number of engine cylinders for the fuel supply to be cutoff according to a steady state deviation of the engine output developed between the target opening angle of the sub throttle valve derived by the second control unit and an actual opening angle of the sub throttle valve.

The above-described object can also be achieved by providing a method for controlling a driving force derived from an internal combustion engine to at least one driven road wheel of an automotive vehicle, comprising:

a) detecting a slip condition of the driven road wheel;

b) adjusting an opening angle of an engine throttle valve so as to control the slip condition of the driven road wheel to a predetermined condition;

c) calculating a target opening angle of the throttle valve according to the detected slip condition;

d) detecting the opening angle of the throttle valve;

e) deriving a steady state deviation of an output of the engine developed between the target opening angle of the throttle valve and the actually detected opening angle thereof; and g) compensating the derived steady state deviation using another driving force reducing means.

BRIEF DESCRIPTION OF THE DRAWINGS

FIG. 3 is a circuit block diagram of an example of a traction control unit shown in FIG. 1.

BEST MODE FOR CARRYING OUT THE INVENTION

Reference will hereinafter be made to the drawings in order to facilitate a better understanding of the present invention.

Figure 1:
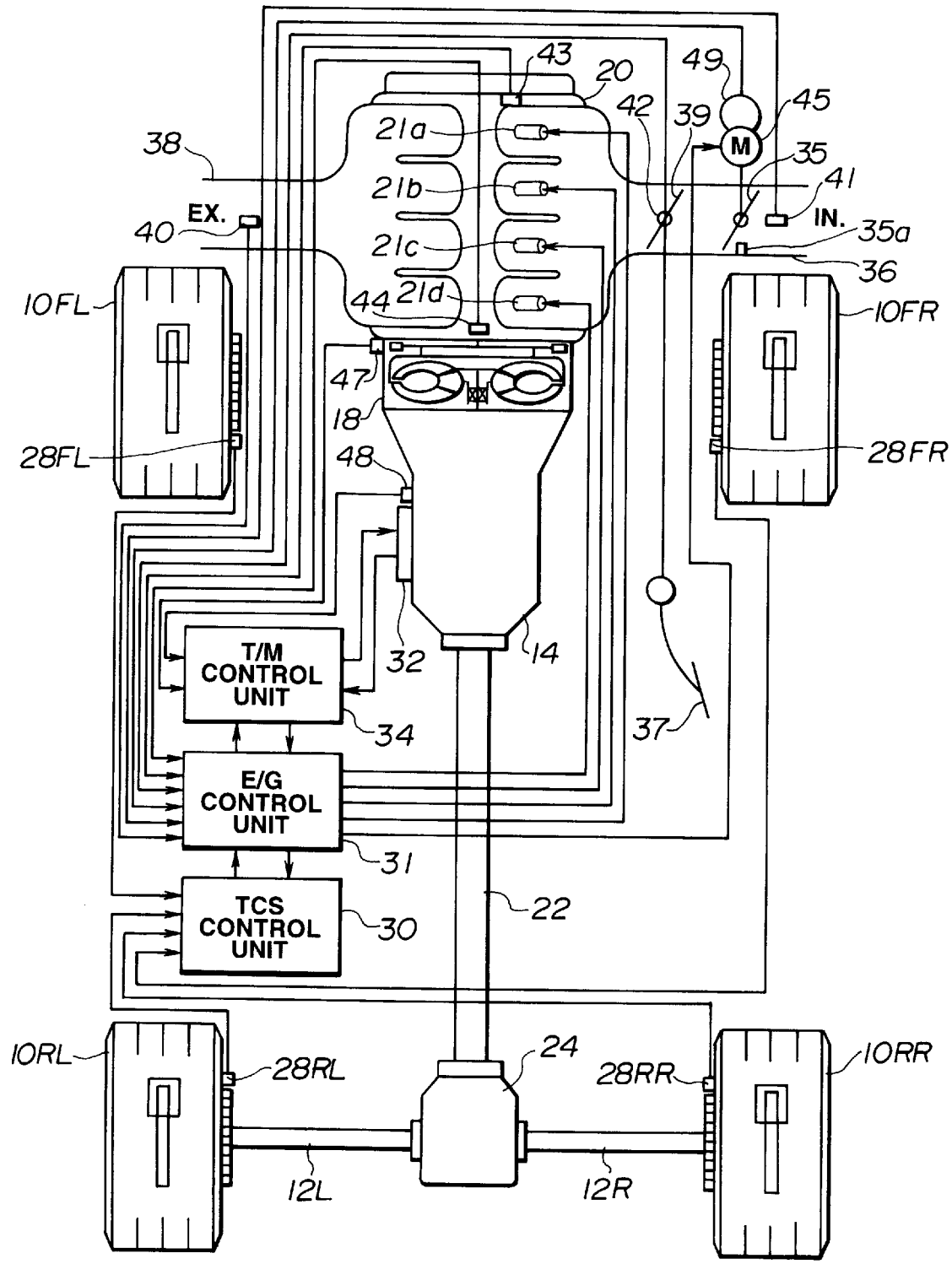
FIG. 1 is a schematic circuit block diagram of a vehicular driving force controlling apparatus in a preferred embodiment applicable to a vehicle.

FIG. 1 shows a rough view of a vehicle to which a vehicular driving force controlling apparatus in a preferred embodiment according to the present invention is applicable.

Front left and right road wheels 10FL and 10FR are mounted in a vehicle which serve as non-driven road wheels and rear left and right road wheels 10RL and 10RR are mounted in a vehicle which serve as driven road wheels.

An output of an internal combustion engine 20 is transmitted to an automatic power transmission 14 via a torque converter 18, the output revolution speed is reduced with a gear ratio selected automatically in the automatic power transmission 14 thereof, and a driving torque is adjusted thereby. The driving torque is distributed to the rear left and right road wheels 12L and 12R via a propeller shaft 22 and a differential gear 24. The rotational driving force is transmitted to a road surface via the rear left and right road wheels 10RL and 10RR.

An intake air passage 36 of the engine 20 is provided with a main throttle valve (first throttle valve) 39 whose opening angle is variably adjusted according to a depression angle (rate) of an accelerator pedal 37 and a sub throttle valve (second throttle valve) 35 whose opening angle is variably adjusted according to a rotational angle corresponding to a number of steps of an actuator constituted by a stepping motor 45, both first and second throttle valves being installed together in series with each other. The engine 20 has four cylinders and four injectors 21a, 21b, 21c, and 21d (fuel injection devices) through each of which a determined quantity of fuel is supplied to each of the cylinders. The injectors 21a through 21d serve to adjust the quantity of fuel and timing of injection to the respective cylinders according to drive signals derived from an engine control unit 31 as will be described later. It is possible to carry out a fuel supply cutoff (the fuel injection is halted) to one or any of the cylinders according to the request (drive) signals from the engine control unit 31.

In addition, the main throttle valve 39 is mechanically interlocked with a depression angle of the accelerator pedal 37 or an opening angle of the main throttle valve 39 is controlled by means of a control unit 31 according to the detected value of the depression angle of the accelerator pedal 37. The number of the steps (rotational angle) of the stepping motor 45 is controlled in response to a drive signal from the control unit 31 and the opening angle of the second (sub) throttle valve 35 which is normally open is adjusted toward a close direction according to the number of the steps of the stepping motor 45. In the embodiment, the rotational angle of the stepping motor 45 is detected by means of a throttle motor sensor 49 and the embodiment enables a feedback control of the rotational angle of the stepping motor 45 according to the drive signal derived from the engine control unit 31 so as to achieve a desired vehicle speed using, for example, the sub throttle valve 35 as a vehicle speed automatic control mechanism. Various sensors required for the engine control unit 31 to electronically control a combustion state of the engine 20 are installed around the engine 20. Specifically, an airflow meter 41 which detects an air flow quantity for combustion is installed within the intake air passage 36, $O_2$ sensor 40 which detects an oxygen concentration in the exhaust gas of the engine 20 is installed in an exhaust gas passage 38, a knocking sensor 44 which detects an occurrence of engine knocking is installed on an outside of cylinder block, an engine revolution speed sensor 47 which detects a revolution speed $N_E$ of the engine 20 is installed on a part of the engine 20 associated with an engine crankshaft, and a coolant temperature sensor 43 which detects an engine coolant temperature is installed in a vicinity to a coolant passage of the engine 20.

The detected signals from the above-described sensors are outputted to the engine control unit 31 and an automatic power transmission control unit 34.

The automatic power transmission 14 has an actuator unit 32 which is actuated in response to a control signal or drive signal from the transmission control unit 34. The gear ratio within the automatic power transmission 14 controlled by the transmission control unit 34 is controlled so as to provide a vehicular final speed reduction ratio which achieves an optimum driving torque according to the driving condition with the vehicle speed which is a substitution for an output shaft revolution speed and is detected by a vehicle speed sensor 48 and the opening angle of the first throttle valve detected by the throttle sensor 42 as variables, or with reference to the engine revolution speed detected by the engine revolution speed sensor 47.

The transmission control unit 34 is communicated with the engine control unit 31 to exchange the vehicular information so as to perform an optimum control over the engine 20 and automatic power transmission 14 during the normal run of the vehicle.

Road wheel speed sensors 28FL, 28FR, 28RL, and 28RR are installed on the respective road wheels 10FL, 10FR, 10RL, and 10RR. Pulse signals according to revolution speeds (velocities) of the respective road wheels 10FL through 10RR are outputted to a traction control unit 30 as the corresponding road wheel speeds $VW_{FL}$ through $VW_{RR}$.

In addition, the engine control unit 31 includes a microcomputer having a CPU (Central Processing Unit), ROM (Read Only Memory), RAM (Random Access Memory), Input/Output interface, and a common bus.

The engine control unit 31 receives the signals indicating, for example, an engine coolant temperature detected by the engine coolant temperature sensor 43; an engine revolution speed $N_E$ detected by the engine revolution speed sensor 43; a throttle opening angle of the main throttle valve detected by the throttle sensor 42; a throttle motor rotational angle detected by the throttle motor sensor 49; a throttle motor rotational angle detected by the throttle motor sensor 49; the oxygen concentration in the exhaust gas detected by $O_2$ sensor 40; the engine knocking state detected by the knock sensor 44; and the intake air quantity detected by the airflow meter 41, and, on the basis of the received signals and in response to a calculation processing that the microcomputer has its own in the ROM, request or information signals from the transmission control unit 34 and the traction control unit 30, adjusts turn on and off timings and fuel injection quantities of the respective injectors 21a, 21b, 21c, and 21d, controls the air-fuel mixture ratio by adjusting the opening angle of the sub throttle valve 35 so as to control the combustion state of each cylinder of the engine 20, controls the engine revolution speed and output of the engine 20, thus achieving a smooth acceleration feeling and necessary and sufficient deceleration feeling, and performs an optimum control over an ignition timing of each ignition plug and the engine idling speed according to the vehicular driving condition.

The engine control unit 31, then, stops (halts) the fuel injection to a required one or more of the engine cylinders through the corresponding one or more of the injectors 21a, 21b, 21c, and 21d and controls the opening angle of the sub throttle valve 35 toward the close direction according to a fuel cutoff request signal and a sub throttle valve opening angle request signal derived from the traction control unit 30.

Figure 2:
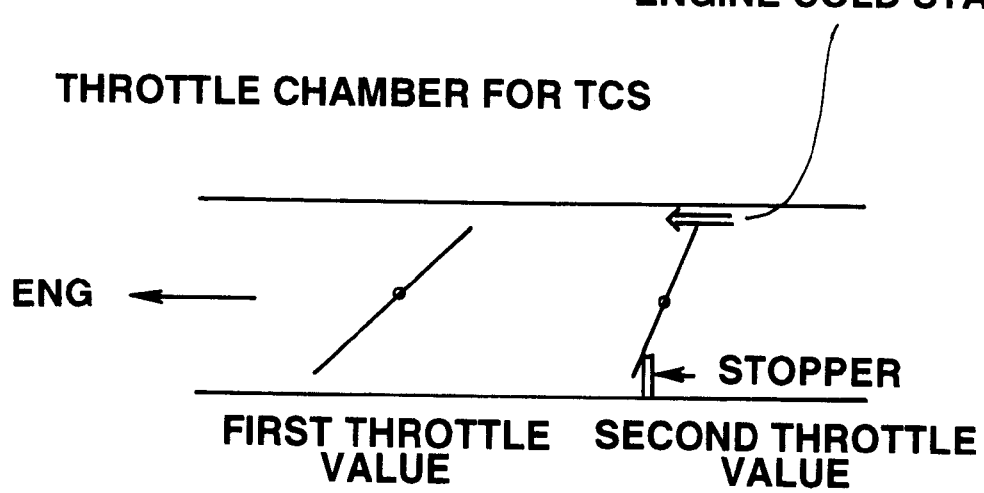
FIG. 2 is an explanatory view of a sub throttle valve which is not fully (completely) closed although a full close command is received.

FIG. 2 shows a structure of a throttle chamber of the intake air passage of the engine 20 shown in FIG. 1.

As shown in FIGS. 1 and 2, a mechanical full close stopper 35a is installed in the sub throttle valve 35 so as to be contactable against a valve body of the sub throttle valve 35. Therefore, even if a full close command signal is issued from the engine control unit 31 which corresponds to a full close state of the sub throttle valve 35 to the stepping motor 45, the valve body of the sub throttle valve 35 is actually contacted against the full close stopper 35a so that the sub throttle valve 35 is not at the completely closed position. This is because the intake air quantity required to maintain the idling speed during the engine cold state, in other words, required to maintain an anti-engine stalling revolution speed during the engine cold state is secured. This intake air quantity can be derived from, e.g., the idling speed and engine revolution speed, from a variation percentage in time of the throttle valve opening angle, or from the immediately before the fuel injection state.

FIG. 3 shows a circuit block diagram of the traction control unit 30 shown in FIG. 1.

The traction control unit (TCS control unit) 30 includes: the microcomputer 84 having the Input interface circuit 84a having an analog-to-digital conversion function, a calculation processing unit 84b having a microprocessor (MPU) (however, in FIG. 3, CPU), a memory 84c (MEM) having the ROM and RAM, the Output interface circuit 84d having a digital-to-analog conversion function. The MPU (CPU) 84b executes the calculation processing such as calculating an output value of a target number $N^*_{CUT}$ of the cylinders for which the fuel supply is cut off to the engine control unit 31 and calculating an output value of a target throttle valve opening angle $\theta^*s$ to the sub throttle valve 35. The memory (MEM) 84c previously stores programs required to calculate the above-described output values in the MPU 84b and sequentially and temporarily stores the processing results of the calculations executed by the MPU 84b.

Figure 4A:
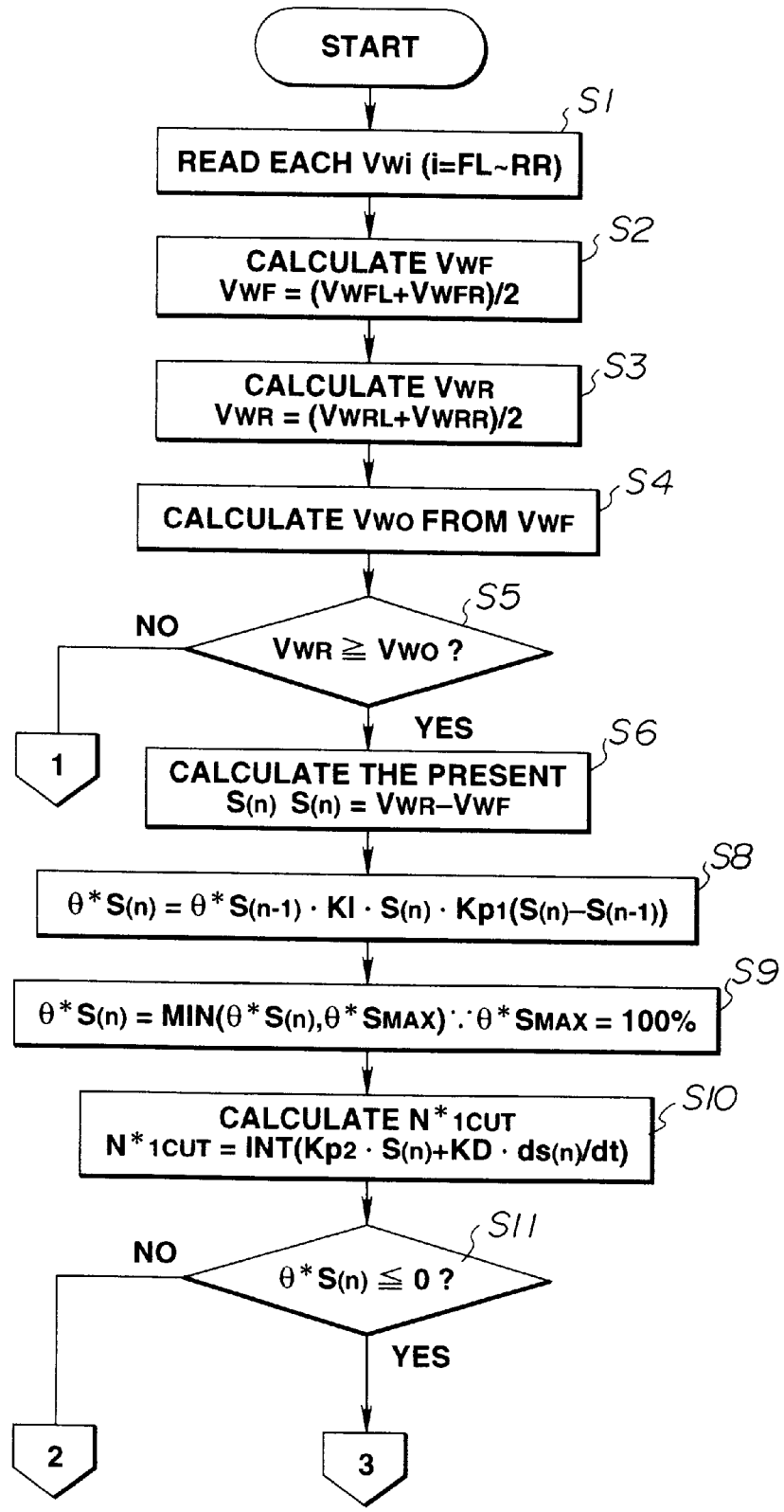
FIGS. 4A and 4B are integrally an operational flowchart executed by the traction control unit shown in FIGS. 1 and 3.
Figure 4B:
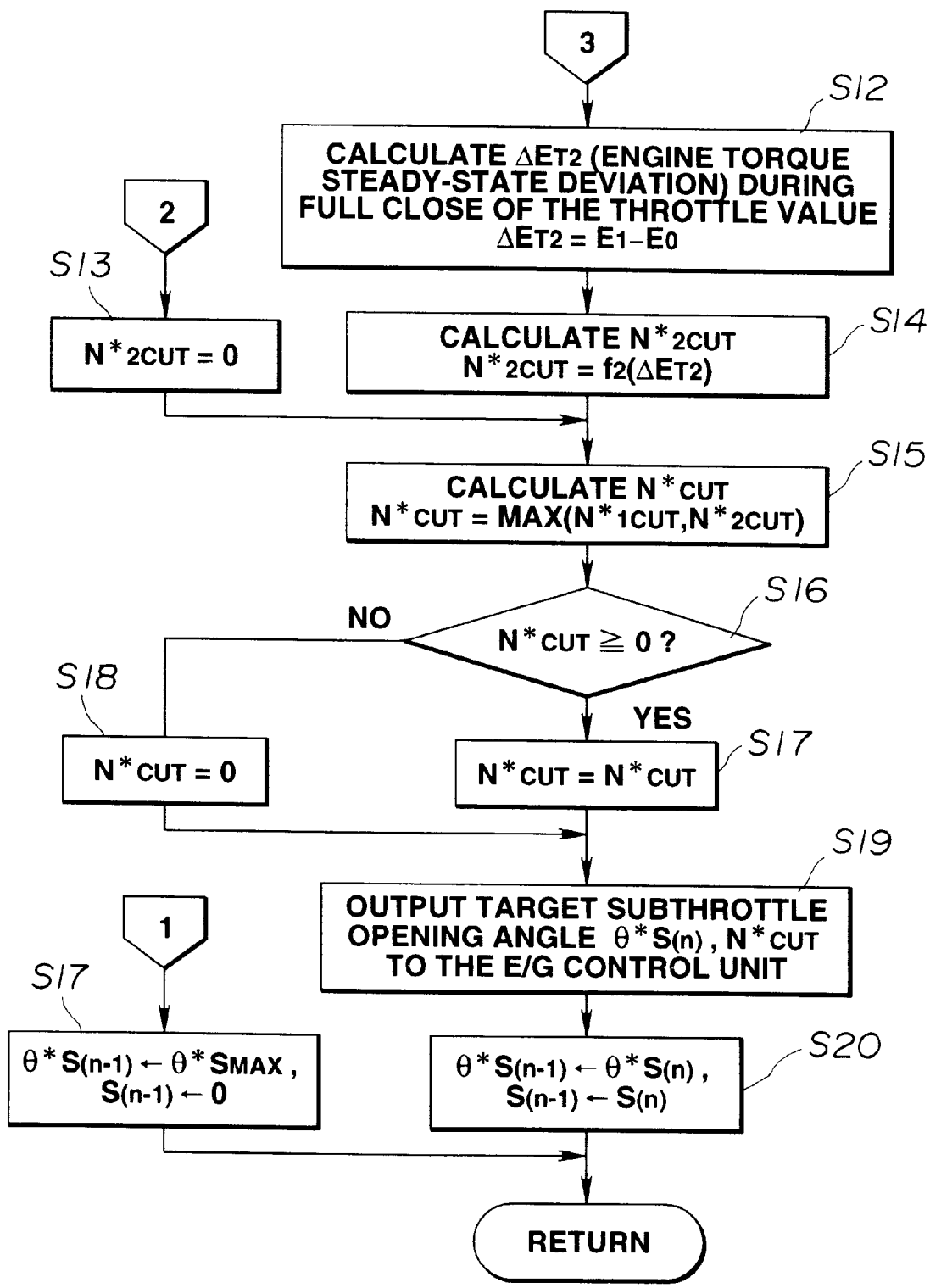

FIG. 4A and 4B integrally show an operational flowchart executed by the microcomputer 84 of the traction control unit 30.

It is noted that in the calculation processing shown in FIGS. 4A and 4B, additional steps to communicate with the other control units 31 and 34 are not provided and the calculation results are sequentially stored in the memory (MEM) 84c, the information stored in the memory 84c being transmitted into buffers such as the calculation processing unit 84b.

The calculation processing shown in FIGS. 4A and 4B is executed as an interrupt routine for each predetermined sampling time $\Delta T$ such as 5 msec.

First, at a step S1, the CPU 84b reads the road wheel velocities $V_{wi}$ (i=FL, FR, RL, RR) from the respective road wheel speed sensors 28FL, 28FR, 28RL, and 28RR.

At a step S2, the CPU 84b calculates, using the following equation (6), an average front road wheel velocity (average non-driven road wheel velocity) $V_{WF}$ supposing that a vehicle body speed (velocity) which is an object to be compared to an average rear road wheel velocity of the driven road wheels is equivalent to the average value of the front left and right road wheel velocities $VW_{FL}$ and $VW_{FR}$.

$$V_{WF}=(VW_{FL}+VW_{FR})/2 \qquad (6).$$

Next, at a step S3, the CPU 84b calculates an average rear road wheel velocity (driven road wheel velocity) $V_{WR}$ from the rear left and right road wheel velocities $VW_{RL}$ and $V_{WR}$ R of the rear left and right road wheels 10RL and 10RR using the following equation (5).

$$V_{WR}=(VW_{RL}+VW_{RR})/2 \qquad (5).$$

Figure 5:
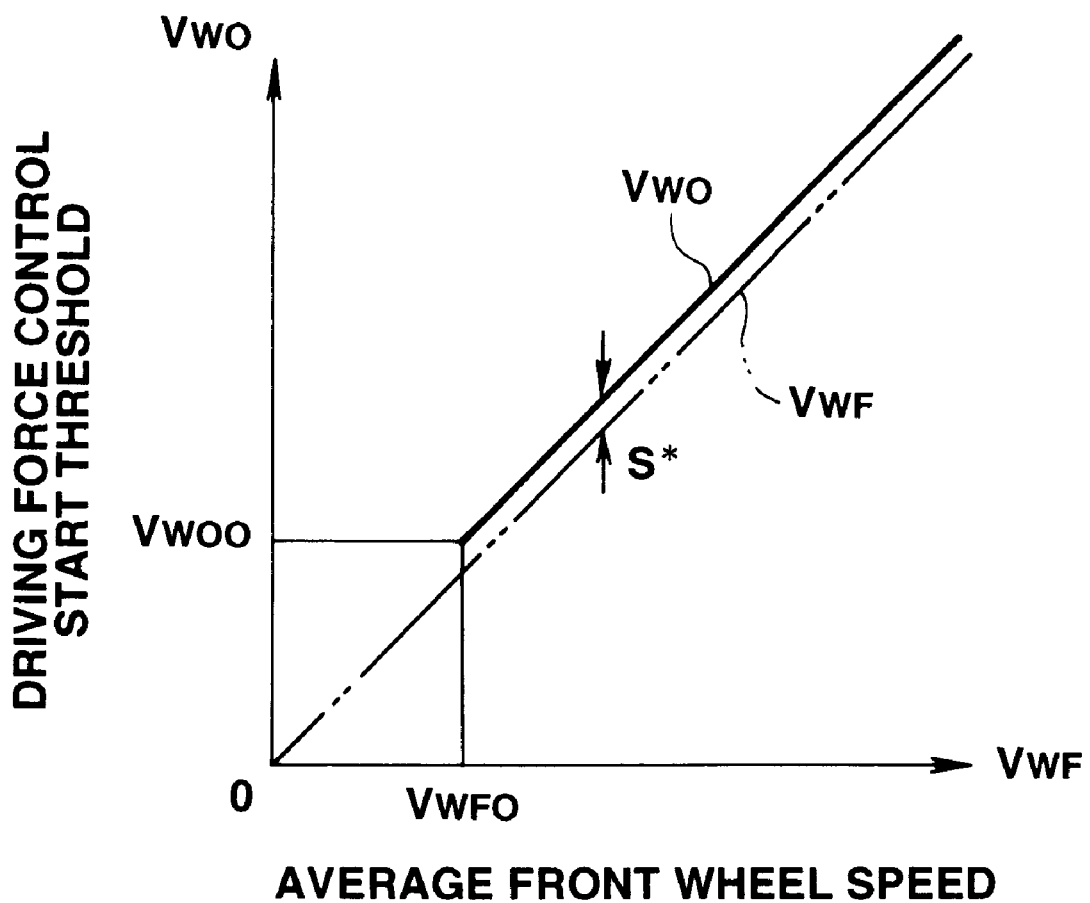
FIG. 5 is a control map of an example of a driving force control start threshold set in a calculation processing of FIGS. 4A and 4B according to an average front road wheel speed equivalent to a vehicle body speed.

At the next step S4, the CPU 84b sets a driving force control start threshold $V_{W0}$ according to the calculated average front road wheel velocity $V_{WF}$ with reference to a control map shown in FIG. 5 indicating a driving force control start threshold value $V_{W0}$-vs-average front road wheel velocity $V_{WF}$ graph.

The control map shown in FIG. 5 is set such that, in a region where at least average front road wheel velocity $V_{WF}$ is equal to or above a predetermined value $VW_{FO}$, a driving force control start threshold $V_{W0}$ is larger than the average front road wheel velocity $V_{WF}$ by a predetermined value S* and is inclined through the same angle as that of the average front road wheel velocity $V_{WF}$, i.e., increased linearly as the average front road wheel velocity $V_{WF}$ is increased. In other words, it can easily be imaged that in this region unless the average rear road wheel velocity $V_{WR}$ which is the driven road wheel velocity is equal to or above the driving force control start threshold $V_{W0}$, the driving force control is not started.

On the contrary, it will be appreciated that the driven road wheel velocity at which the driving force control is not started with respect to the average front road wheel velocity $V_{WF}$ or the predetermined value S* corresponding to the region in which the average rear road wheel velocity $V_{WR}$ is equal to or below the driving force control start threshold $V_{W0}$ is a predetermined slip condition of the driven road wheels in the case of the present invention or a target slip condition.

On the other hand, in a region wherein the average front road wheel velocity $V_{WF}$ is equal to or below the predetermined value $V_{W0}$, the average rear road wheel velocity $V_{WR}$ corresponding to the driving force control start threshold value $V_{W0}$ is maintained constant at the predetermined value $V_{W00}$.

The predetermined value $V_{W00}$ of the driving force control start threshold is a boundary value such that if the average rear road wheel velocity $V_{WR}$ which is the driven road wheel velocity is reduced any more therefrom, the engine 20 which is in a direct coupled state, cannot be maintain the idling speed and enters the engine stalling state. In other words, the predetermined value $V_{W00}$ is an engine stall preventing minimum engine revolution speed.

In the preferred embodiment, the predetermined value $V_{W00}$ of the driving force control threshold corresponding to the engine stall preventing minimum engine revolution speed is fixed according to the value of the engine idling speed, for example, during the engine cold start. However, since the engine stall preventing minimum engine revolution speed is variably controlled according to the engine coolant temperature as described above, it is possible to variably set the predetermined value $V_{W00}$ of the driving force control start threshold value according to the engine stall minimum engine revolution speed variably controlled by means of the engine control unit 31. Then, when the predetermined value $V_{W00}$ is set to be smaller according to the minimum revolution speed which is set to be smaller, the average front road wheel velocity $V_{WF}$ is deemed to be the vehicle body speed so that a controlled region of the sum of the predetermined value with the predetermined slip rate S* becomes wider, thereby the slippage on the driven road wheels being earlier converged.

It is noted that the predetermined value $V_{W00}$ of the driving force control start threshold may variably be set according to the gear ratio set in the automatic power transmission 14. That is to say, a gear ratio position of the automatic power transmission 14 with only a vehicle start taken into consideration is supposed to be at, so-called, first speed range (position). Hence, the predetermined value $V_{W00}$ of the driving force start threshold corresponding to the engine stall preventing minimum engine revolution speed is determined depending solely on a speed reduction ratio corresponding to the first speed gear range of the transmission 14. However, this sole dependency is lost in cases where the vehicle driver starts the vehicle on, for example, icy snow road with the gear ratio of the transmission 14 initially selected at a second speed range and where the vehicle in which the automatic power transmission 14 is mounted is running at a vehicle speed whose value is higher than the predetermined value $V_{W00}$ of the driving force start threshold with the second gear range or higher but the gear speed range is still at the second speed range or higher due to a response delay in the automatic power transmission side although the vehicle speed becomes below the predetermined value $V_{W00}$ of the driving force control threshold and thereafter the vehicular abrupt acceleration occurs with the accelerator pedal deeply depressed. Since the gear ratio of the automatic power transmission 14, in other words, the speed reduction ratio is merely a parameter to set the predetermined value VWoo of the driving force control start threshold from the engine stall preventing minimum revolution speed, the present gear ratio may, for example, be read from the transmission control unit 34 in the above-described cases and the predetermined value $V_{W00}$ may be set using the read gear ratio as the parameter.

Referring back to FIG. 4A, the routine goes to a step S5 in which the CPU 84b determines whether the average rear road wheel velocity $V_{WR}$ which is the driven road wheel velocity is equal to or above the driving force control threshold $V_{W0}$.

If Yes at the step S5 ($V_{WR} \geq V_{W0}$), the routine goes to a step S6. If No at the step S5 ($V_{WR} < V_{W0}$), the routine goes to a step S7.

At the step S6, the CPU 84b calculates an average slip speed of the rear left and right road wheels 10RL and 10RR from a deviation between the average rear road wheel velocity $V_{WR}$ and average front road wheel velocity $V_{WF}$ as the present value $S_{(n)}$ of the driven road wheel slip rate (condition) using the following equation (7).

$$S(n)=V_{WR}-V_{WF} \qquad (7)$$

Next, the routine goes to a step S8.

At the step S8, the CPU 84c calculates the present value $\theta^*s(n)$ of the target sub throttle valve opening angle using the present value $S(n)$ of the slip rate, the previous value $S(n-1)$ of the slip rate updated and stored in the memory 84c and the previous value $\theta^*s(n-1)$ of the target throttle valve opening angle in accordance with the following equation (8) and the routine goes to a step S9.

$$\theta^*s(n)=\theta^*s(n-1)-K_I\cdot S(n)-K_{P1}\cdot(S(n)-S(n-1)) \qquad (8)$$

In the equation (8), $K_I$ denotes an integral (integration) gain of control and $K_{P1}$ denotes a proportional gain of control.

It is noted that, in order to exhibit the inherent characteristic of the driving force control through the control over the throttle valve opening angle such a relatively slow responsive characteristic as described above, the integral gain $K_I$ is set to a relatively large value and the proportional gain $K_{P1}$ is set to a relatively small value. Hence, as appreciated from the equation (8), during the presence of the slip rate, i.e., during a positive value of the present value $S(n)$ of the slip rate, the present value $\theta^*s(n)$ of the target sub throttle valve opening angle is progressively reduced than the previous value $S(n-1)$ so as to promote the convergence of the slippage and so as to give a negative value to a value of a subtraction of the previous value $S(n-1)$ from the present value $S(n)$ of the slip rate.

That is to say, in a case where the slip rate itself becomes smaller, the present value $\theta^*s(n)$ of the target sub throttle valve opening angle is progressively set to be larger than the previous value $\theta^*s(n-1)$ so that the average rear road wheel velocity $V_{WR}$ which is the driven road wheel velocity is feedback controlled so as to be recovered slowly.

Then, at the step S9, the CPU 84b determines which of either the present value $\theta^*s(n)$ of the target sub throttle valve opening angle is smaller as the present value $\theta^*s(n)$ of the target sub throttle opening angle in accordance with the following equation (9). Thereafter, the routine goes to a step S10.

$$\theta^*s(n)=\text{MIN}(\theta^*s(n),\theta^*_{sMAX}) \qquad (9)$$

It is noted that in the equation (9), MIN denotes a selection of a minimum value and the maximum value $\theta^*_{sMAX}$ of the sub throttle valve opening angle denotes the opening angle of 100%.

Although it is natural that a magnitude determination between the present value $_0^*s(n)$ of the calculated target sub throttle valve opening angle and the minimum value $\theta^*_{sMIN}$ (=0%) of the sub throttle valve opening angle) should be carried out, in the embodiment, the sub throttle valve 25 is not completely closed due to the presence of the mechanical full close stopper 35a even if, e.g., the present value $\theta^*s(n)$ of the target sub throttle opening angle is below "0", i.e., below the full close position and the present value $\theta^*s(n)$ of the target sub throttle valve opening angle is not set to the minimum value of "0" in order to develop smoothly the driving force feedback control according to the present value $\theta^*s(n)$ of the target sub throttle valve after a second target number of cylinders for which the fuel supply is cut off $N^*_{2CUT}$ gives zero (0 cylinder) when the present value $\theta^*s(n)$ of the target sub throttle opening angle is larger than "0" from a relationship to the second target fuel supply cutoff cylinder numbers $N^*_{2CUT}$. The details thereof will be described later.

In addition, at the step S10, the CPU 84c calculates a first target fuel supply cutoff number of cylinders $N^*_{1CUT}$. The details thereof will be described later.

In addition, referring to FIGS. 4A and 4B, at the step S10, the CPU 84c calculates a first target fuel supply cutoff number of cylinders $N^*_{1CUT}$ in accordance with the following equation (10) using the present value $S(n)$ calculated and its differentiated value $dS(n)/dt$.

$$N^*_{1CUT}=\text{INT}(K_{P2}\cdot S(n)+K_D\cdot(dS(n)/dt)) \qquad (10)$$

In the equation (10), $K_{P2}$ denotes a proportional gain and $K_D$ denotes a differential gain, INT denotes an integer conversion in which fractions (omits the decimal fractions) of the calculated value, and the differentiated value of $dS(n)/dt$ of the slip rate may be derived by dividing a subtraction value of the previous value $S(n-1)$ of the slip rate from the present value $S(n)$ of the slip rate by the predetermined sampling time $\Delta T$. Furthermore, as described above, in order to effect the inherent characteristic of the driving force control through the fuel supply cutoff such that the respective characteristic is relatively quick, the differential gain $K_D$ is set to a relatively large value, and the proportional gain $K_{P2}$ is set to a relatively small value.

Hence, as appreciated from the equation (8), during the increase in the slip rate, i.e., during the indication of the positive value of $(dS(n)/dt)$, it is at the early stage of the slip on the driven road wheels and, simultaneously, the opening angle control may not sufficiently be responded. Therefore, the convergence characteristic of the slippage is fastened with the first target fuel supply cutoff number of cylinders $N^*_{1CUT}$ set largely. For example, in a case where the slip on the driven road wheels is not increased on the normal low $\mu$ road surface, i.e., the value of $(dS(n)/dt)$ is zero or a negative and the present value $S(n)$ of the slip rate is steadily developed (in a steady state manner), the feedback control such that the first target number of the cylinders for which the fuel supply is cut off denoted by $N^*_{1CUT}$ is set to a small value so as not to occur the engine stalling or not to impart the acceleration characteristic on the low $\mu$ road surface is carried out.

In addition, since the content of the equation (10) used at the step S10 is to set a target number of cylinders for which the fuel supply via the corresponding injector(s) is cut off denoted by $N^*_{CUT}$ by means of a proportional differential control with respect to the slip rate so as to reduce the driving force to the rear left and right road wheels 10RL and 10RR which are driven road wheels. Hence, the target fuel cutoff number of the cylinders $N^*_{CUT}$ are in accordance with the quantity of reduction in the driving force to the rear left and right road wheels 10RL and 10RR, i.e., a torque reduction (torque down) quantity $\Delta T (=f_1(\Delta T))$.

Next, at the step S11, the CPU 84b determines whether the present value $\theta^*S(n)$ of the target sub throttle valve opening angle set at the step S8 or step S9 is equal to or below "0". If Yes at the step S11 ($\theta^*S(n)\leq 0$), the routine goes to a step S12. If No at the step S11, the routine goes to a step S13.

At the step S12, the CPU 84c calculates a steady state deviation $\Delta E_{T2}$ of an engine torque during the full close state of the (sub) throttle valve between the engine torque (output) $E_1$ achieved according to the intake air quantity (also called, a leakage air quantity) when the sub throttle valve 25 is fully closed (but actually not fully closed) and the engine torque (output) $E_0$ when the sub throttle valve 25 would really be fully closed, i.e., supposed when the intake air quantity indicates zero in accordance with the following equation (11).

$$\Delta E_{T2} = E_1 - E_0 \qquad (11).$$

Then, the routine goes to a step S14.

It is noted that although both engine torques $E_1$ and $E_0$ are supposed to be approximately constants, these torque values are varied according to such factors as the engine revolution speed, fuel injection states, and/or the time variation percentage of the main or sub throttle valve. In order to meet a strict requirement of the engine torques, the CPU 84b of the traction control unit 30 may retrieve the information on these variables (factors) from the engine control unit 31 and may more accurately calculate $\Delta E_{T2}$.

Next, at the step S14, the CPU 84b calculates the second target fuel supply cutoff number of the cylinders $N^*_{2CUT}$ using the engine torque steady state deviation $\Delta E_{T2}$ during the full close of the throttle valve calculated at the step S12 in accordance with the following equation (12).

$$N^*_{2CUT} = f_2(\Delta E_{T2}) \qquad (12).$$

In the equation (12), $f_2$ denotes a function of the torque down with the engine torque steady state deviation $\Delta E_{T2}$ as a factor. The calculated second target fuel supply cutoff number of the cylinders $N^*_{2CUT}$ may be the number of the cylinders for which the fuel supply is (should be) cut off used to correct the present engine torque (output) to a small value by the engine torque steady state deviation $\Delta E_{T2}$ during the full close state of the throttle valve.

On the other hand, at the step S13, the CPU 84c sets the second target fuel supply cutoff number of the cylinders $N^*_{2CUT}$ to zero and the routine goes to a step S15.

At the step S15, the CPU 84b sets either one of the first target fuel supply cutoff number of cylinders $N^*$ 1CUT or the second target fuel supply cutoff number of the cylinders $N^*_{2CUT}$ which is larger than the other to the target fuel supply cutoff number of cylinders $N^*_{CUT}$ (refer to an equation (13)) and the routine goes to a step S16.

$$N^*_{CUT} = MAX(N^*_{1CUT}, N^*_{2CUT}) \qquad (12).$$

In the equation (13), MAX denotes a selection of the maximum value.

At the step S16, the CPU 84b determines whether the calculated target fuel supply cutoff number of the cylinders $N^*_{CUT}$ is equal to or above zero, i.e., indicates positive value. If Yes ($N^*_{CUT} \geq 0$) at the step S16, the routine goes to a step S17. If No at the step S16, the routine goes to a step S18.

At the step S17, the CPU 84b determines that the calculated target fuel supply cutoff number of the cylinders $N^*_{CUT}$ is positive, i.e., for the $N^*_{CUT}$ to be the reasonable number of the cylinders for the fuel supply to be cut off and directly sets the calculated $N^*_{CUT}$ to be the target fuel supply cutoff number of the cylinders $N^*_{CUT}$.

Then, the routine goes to a step S19.

On the other hand, at the step S18, the CPU 84b determines that the calculated target fuel supply cutoff number of the cylinders $N^*_{CUT}$ is negative, i.e., the calculated fuel supply cutoff number of the cylinders $N^*_{CUT}$ is not reasonable number of the cylinders for the fuel supply to be cut off and sets the target fuel supply cutoff number of the cylinders $N^*_{CUT}$ to zero. Then, the routine goes to a step S19.

Then, at the step S19, the CPU 84b outputs the calculated and set target fuel supply cutoff number of the cylinders $N^*_{CUT}$ and the target sub throttle valve opening angle $\theta^*S(n)$ to the engine control unit 31 as request signals. Then, the routine goes to a step S20.

At the step S20, the CPU 84b updates the present value $\theta^*S(n)$ of the target sub throttle valve opening angle to the previous value $\theta^*S(n-1)$ and updates the present value $S(n)$ of the slip rate to the previous value $S(n-1)$ and stores the updated values into predetermined memory locations of the memory 84c. Then, the routine is returned to the start position of a main program.

On the other hand, at the step S7, the CPU 84b updates the maximum value $\theta^*SMAX$ of the sub throttle valve opening angle into the previous value $\theta^*S(n-1)$ of the sub throttle valve opening angle, updates zero into the previous value $S(n-1)$ of the slip rate, and stores the updated values into other predetermined memory locations of the memory 84c.

Then, the routine is returned to the main program.

In the program shown in FIGS. 4A and 4B, the traction control unit 30 determines whether the vehicle is running at a speed higher than a certain speed, i.e., whether the average front road wheel speed Vw which is the non-driven road wheel velocity equivalent to the vehicle body speed is running at a speed equal to or above the predetermined value $V_{WF0}$, or whether the vehicle is tried to start at a speed lower than the predetermined value $V_{WF0}$, or whether the vehicle is again accelerated after once deceleration. The traction control unit 30 calculates and sets the slip rate S according to the respective situations.

That is to say, the driving force control start threshold (driven road wheel velocity) $V_{W0}$ in the case where the average front road wheel velocity $V_{WF}$ equivalent to the vehicle body speed is equal to or above the predetermined value $V_{WF0}$ is the value larger than the average front road wheel velocity $V_{WF}$ by the predetermined slip rate $S^*$. If the average rear road wheel velocity $V_{WR}$ is smaller than the driving force control threshold $V_{W0}$, the routine passes through the step S5 and step S7 and is returned to the main program. Only if the average rear road wheel velocity $V_{WR}$ is equal to or above the driving force control start threshold $V_{W0}$, at the step S6, the traction control unit 30 calculates the present value $S(n)$ of the slip rate by subtracting the average front road wheel velocity $V_{WF}$ from the average rear road wheel velocity $V_{WR}$. Hence, since the present value $S(n)$ of the slip rate is always above the predetermined slip rate $S^*$, at least the steady state slip occurs on the driven road wheels due to a traction loss during the vehicular acceleration, the predetermined slip rate $S^*$ is set, for example, to the steady state slip rate on the driven road wheels, i.e., the average rear road wheel velocity $V_{WR}$ supposed on the normal medium or high $\mu$ road surface. At this time, a target value of the convergence of the slip rate gives an optimum value. Then, if the predetermined slip rate $S^*$ is larger than the slip rate described above, it is not necessary to execute the unnecessary driving force control and the predetermined slip rate $S^*$ provides a suitable dead zone to enable a control hunting to be suppressed or promoted.

In addition, in a case where the average front road wheel velocity $V_{WF}$ equivalent to the vehicle body speed is smaller than the predetermined value $V_{WF0}$, the driving force control start threshold (driven road wheel velocity) $V_{W0}$ is set to the driven road wheel velocity satisfying the engine stall preventing minimum engine revolution speed, i.e., to the predetermined value $V_{W00}$.

Therefore, the engine may not stall even if the average rear road wheel velocity $V_{WR}$ which is the driven road wheel velocity is reduced up to the driving force control start threshold $V_{W0}$ ($=V_{W00}$).

Thus, such a repetition that, for example, the driving force control causes the engine to be about to once be stalled and, thereafter, the engine revolution speed is increased due to the automatic recovery function may not occur in a case where the engine revolution speed becomes lower than the engine stall preventing minimum engine revolution speed. Hence, the vehicular behavior doe not become unstable. Of course, if the predetermined value $V_{W00}$ of the driving force control threshold start is variably set according to the engine stall preventing minimum engine revolution speed (which is varied according to the engine coolant temperature) and the gear ratio of the transmission, it is possible to perform a mist suitable driving force control not only when the average front road wheel velocity VWF is smaller than the predetermined value VWF0 but also when the vehicle is running with the steady state slippage occurs (at $V_{WF} \geq V_{WF0}$)

FIGS. 6A through 6D integrally show a timing chart for explaining an operation of the driving force controlling apparatus as a result of execution of the flowchart shown in FIGS. 4A and 4B.

It is noted that when the vehicle is normally running at a speed equal to or above the certain vehicle speed (for example, the predetermined value $V_{WF0}$ of the average front road wheel speed), the driving force supplied to the rear left and right road wheels 10RL and 10RR is appropriately controlled through the combination of the sub throttle valve opening angle control and the cylinder fuel supply cutoff control so that the average rear road wheel velocity $V_{WR}$ becomes a sum of the average front road wheel velocity $V_{WF}$ which would be equivalent to the vehicle body speed and predetermined slip rate S*, i.e., becomes the driving force control start threshold $V_{W0}$ (driven road wheel velocity). The detailed explanation of the above-described running situation will herein be omitted.

The timing chart shown in FIGS. 6A through 6D is a simulation result when the vehicle to which the embodiment of the driving force controlling apparatus is applicable is abruptly started at a time $t_{00}$ from a stopped state on an extremely low $\mu$ road surface such as a frozen road surface.

Figure 6A:
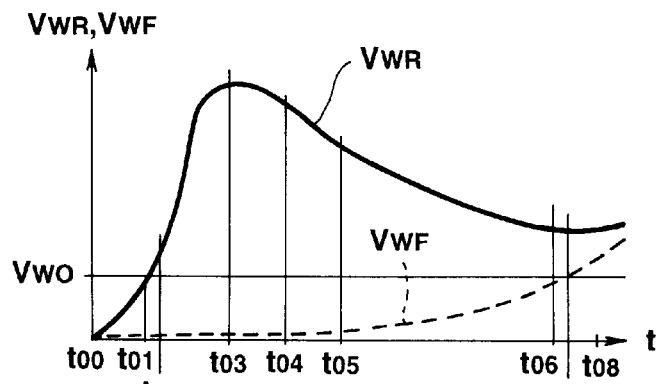
FIGS. 6A, 6B, 6C, and 6D are integrally a timing chart for explaining an operation of the driving force controlling apparatus shown in FIGS. 1 to 5.

FIG. 6A shows time variations of the average rear road wheel velocity $V_{WR}$ and the average front road wheel velocity $V_{WF}$.

Figure 6B:
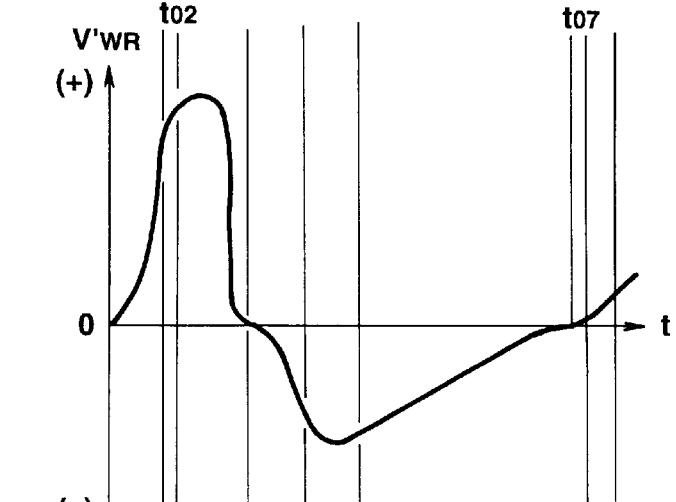

FIG. 6B shows the time variation of an average rear road wheel acceleration $V'_{WR}$ as a differential value of the average rear road wheel velocity $V_{WR}$.

Figure 6C:
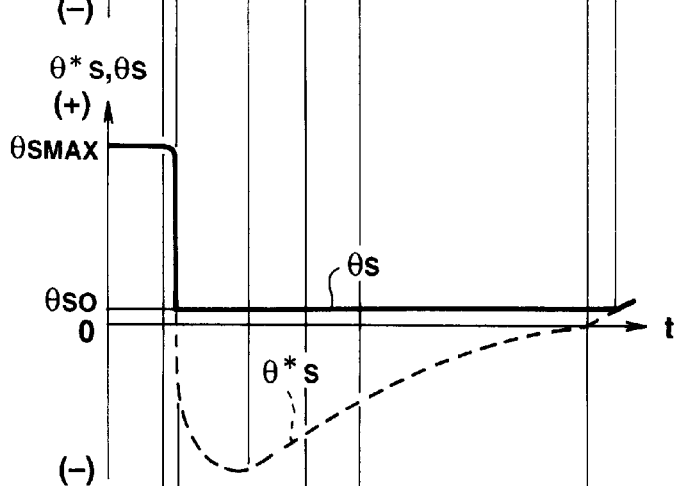

FIG. 6C shows the time variations of the target sub throttle valve opening angle θ*s and the actual sub throttle valve opening angle θs actually achieved by means of the sub throttle valve 25.

Figure 6D:
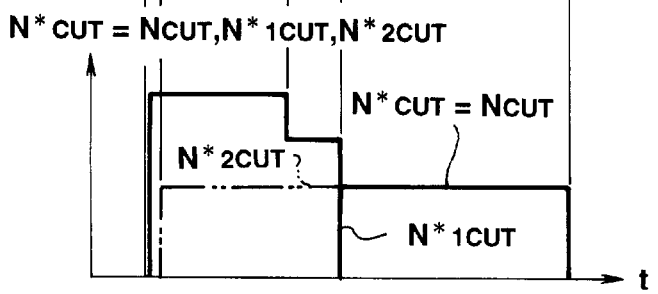

FIG. 6D shows the time variations of the target fuel supply cutoff number of the cylinders $N^*_{CUT}$ (including the first and second fuel supply cutoff numbers of the cylinders $N^*_{1CUT}$ and $N^*_{2CUT}$) and the number of the cylinders for which the fuel supply is actually cut off ($N_{CUT}$) actually executed by the engine control unit 31.

It is noted that, in the timing chart of FIGS. 6A through 6D, the average front road wheel velocity $V_{WF}$ equivalent to the vehicle body speed is not equal to or above the predetermined value $V_{WF0}$ and, therefore, the driving force control start threshold $V_{W0}$ set at the step S4 in the calculation processing of FIGS. 4A and 4B is supposed to be constantly set to the predetermined value $V_{W00}$.

First, at a time duration up to the time $t_{00}$, the engine revolution speed is maintained and controlled at the engine stall preventing minimum engine revolution speed as the idling speed. Of course, during the time duration described above, the target sub throttle valve opening angle θ*s is set and maintained at the maximum value θ*$s_{MAX}$ and the target fuel supply cutoff number of the cylinders $N^*_{CUT}$ is set is set and maintained at "0". These actual values are coincident with those target values. Then, at the time $t_{00}$, since the vehicle driver has depressed deeply on the accelerator pedal to abruptly start the vehicle, the engine revolution speed has started to be largely increased with a lag with respect to the deep depression on the accelerator pedal, the accompanied increase in the engine output causes an average rear road wheel acceleration $V'_{WR}$ to be largely increased in a positive region, and the average rear road wheel velocity $V_{WR}$ with the phase delay with respect to the average rear road wheel acceleration $V'_{WR}$ is gradually increased.

However, the increase in the average rear road wheel acceleration $V'_{WR}$ and the average rear road wheel velocity $V_{WR}$ doe not involve the vehicular body movement but serve for the vehicle to be slipped on the extremely low $\mu$ road surface. Hence, the average front road wheel velocity $V_{WF}$ equivalent to the vehicle body speed is hardly or not wholly increased any more. Thus, during a time duration from the time $t_{00}$ to a time $t_{01}$, in which the average rear road wheel velocity $V_{WR}$ is at least equal to or above the driving force control start threshold $V_{W0}$, the routine merely passes from the step S5 in the calculation processing of FIGS. 4A and 4B to the step S7 and is repeated. In addition, since neither the target sub throttle valve opening angle θ*s nor the target fuel supply cutoff number of the cylinders $N^*_{CUT}$ is repeated to the engine control unit 31, the actual opening angle θs of the sub throttle valve 35 is maintained at the maximum value θ$_{SMAX}$ and the actual fuel supply cutoff number of the cylinder(s) $N_{CUT}$ is continued to be in a state of no fuel supply cutoff according to, e.g., zero cylinder.

Next, when the average rear road wheel velocity $V_{WR}$ is equal to or above the driving force control threshold $V_{W0}$ at the time $t_{01}$, the routine of FIGS. 4A and 4B to be executed immediately thereafter is transferred from the step S5 to the step S6 in which the present value S(n) of the slip rate is calculated, to the step S7 in which the present value θ*S(n) of the target sub throttle valve opening angle is calculated, and to the step S8 in which θ*S(n) is compared with the maximum value θ*$_{SMAX}$ of the target sub throttle valve opening angle so that either one of both compared values which is smaller than the other is selected as the target sub throttle valve opening angle θ*S(n). However, since the target sub throttle valve opening angle θ*S(n) is such that the integral gain $K_I$, is large or the proportional gain $K_P$ is small, as described in the equation (8), the target sub throttle valve opening angle θ*S(n) is held at a value slightly smaller than the maximum value θ*$_{SMAX}$ at a time immediately after the time $t_{01}$, at which the slip rate S(n) itself is not yet large and may quickly be reduced along with the increase in the thereafter slip rate S(n). On the other hand, in the processing routine of FIGS. 4A and 4B, the first target fuel supply cutoff number of the cylinders $N^*_{1CUT}$ is calculated at the step S10. This first target fuel supply cutoff number of the cylinders $N^*_{1CUT}$ is calculated at the step S10. This first target fuel supply cutoff number of the cylinders $N^*_{1CUT}$ is calculated at the step S10. This first target fuel supply cutoff number of the cylinders $N^*_{1CUT}$ is such that the differential gain $K_D$ is large or proportional gain $K_P$ is small in he equation (10). Hence, as shown in FIGS. 6A, suppose that the first target fuel supply cutoff number of the cylinders $N^*_{CUT}$ is set, for example, to "four" of a four-cylinder engine 20 immediately after the time $t_{10}$ at which the average rear road wheel acceleration $V_{WR}$ is sufficiently large in the positive value region. Then, in the calculation processing of FIGS. 4A and 4B, since the target sub throttle valve opening angle θ*S(N)

is still larger than "0", the routine goes from the step s11 to the step S13 and since the second target fuel supply cutoff number of the cylinders $N^*_{2CUT}$ is set to "0 (cylinder to be fuel supply cut off is zero)". Hence, at the step S15, the first target fuel supply cutoff number of the cylinders $N^*_{1CUT}$ which is larger than the second one $N^*_{2CUT}$ is selected as the target fuel supply cutoff number of the cylinders $N^*_{CUT}$ at the step S15.

Since this target fuel supply cutoff number of the cylinders $N^*_{CUT}$ indicates positive, the routine in FIGS. 4A and 4Bis transferred from the step S16 to the step S17 in which the value of $N^*_{CUT}$ remains unchanged and to the step S19 in which the target sub throttle valve opening angle $\theta^*S(n)$ which is slightly smaller than the maximum value $\theta^*_{SMAX}$ is requested to the engine control unit 31. Consequently, the engine control unit 31 executes the fuel supply cutoff by the number of the cylinders corresponding to the target fuel supply cutoff number of the cylinders $N^*_{CUT}$ (indicating "four"). Hence, the actual number of the cylinders for the fuel supply to be actually cut off is coincident with the target fuel supply cutoff number of the cylinders $N^*_{CUT}$. The actual opening angle $\theta S(n)$ of the sub throttle valve 25 is coincident with the target opening angle of the second (sub) throttle valve $\theta^*S(n)$.

Due to these coincidences, the increase rate of engine revolution speed becomes small and the increase rate of the average rear road wheel acceleration $V_{WR}$ becomes accordingly small. The average rear road wheel velocity $V_{WR}$ having the phase lag with respect to the engine revolution speed and acceleration $V'_{WR}$ is thereafter continued. Thus, at the step S8, the average rear road wheel velocity $V_{WR}$ is calculated. The target sub throttle valve opening angle $\theta^*S(n)$ selected at the step S9 becomes smaller in the acceleration manner. Finally, the value of $\theta^*S(n)$ is below zero at a time $t_{02}$. At this time, the first target fuel supply number of the cylinders $N^*_{1CUT}$ calculated at the step S10 is continued to indicate "four" since the average rear road wheel acceleration $V'_{WR}$ is still large. In the processing routine of FIGS. 4A and 4B, the routine is transferred from the step S11 to the step S12 in which the engine torque steady state deviation $\Delta ET2$ during the full close state of the sub throttle valve 35 is calculated since, at this time, the target sub throttle valve opening angle $\theta^*S(n)$ is below zero. At the next step S13, the second target fuel supply cutoff number of the cylinders $N^*_{2CUT}$ is calculated which is in accordance with the torque down function $f_2$ to correct the steady state deviation $\Delta E_{T2}$. However, in the embodiment, suppose that the second target fuel supply cutoff number of the cylinders $N^*_{2CUT}$ constantly processed is at least smaller than the first target fuel supply cutoff number of the cylinders $N^*_{1CUT}$ and is set to the numerical value corresponding to, e.g., "two". At the step S15, the first target fuel supply cutoff number of the cylinders $N^*_{1CUT}$ is selected as the target fuel supply cutoff number of the cylinders $N^*_{CUT}$. Then, the target fuel supply cutoff number of the cylinders $N^*_{CUT}$ and target sub throttle valve opening angle $\theta^*s(n)$ are outputted to the engine control unit 31 as the requested signals. At this time, in the engine control unit 31, the actual sub throttle valve opening angle $\theta s$ and the target sub throttle valve opening angle $\theta^*s$ are coincident with each other. However, the actual sub throttle opening angle $\theta s$ is not coincident with the target sub throttle valve opening angle $\theta^*s$ and is limited to the predetermined opening angle $\theta_{s0}$ corresponding to the leakage air quantity limited by the mechanical full close stopper.

Although a predetermined torque is left in the engine due to the leakage air quantity caused by the predetermined opening angle $\theta_{s0}$ of the actual sub throttle opening angle, the actual fuel supply cutoff number of the cylinders $N_{CUT}$ corresponding to the "four" cylinders is continued so that the increase rate of the engine revolution speed is thereafter continued to be reduced and, then, is zeroed and is changed to a decrease rate. Correspondingly, the increase rate of the average rear road wheel acceleration $V'_{WR}$ becomes reduced, indicates its peak value, and is changed from the increase rate to the decrease rate. Furthermore, at a time $t_{03}$, the average rear road wheel velocity $V_{WR}$ gives zero. The average rear road wheel velocity $V_{WR}$ has the peak value at the time $t_{03}$ and thereafter is reduced. During the time duration from the time $t_{02}$ to the time $t_{03}$, the first target fuel supply cutoff number of the cylinders $N^*_{1CUT}$ dominated mainly by the average rear road wheel acceleration $V'_{WR}$ is still continued to be set to a value corresponding to "four" cylinders at the step S10 and the second target fuel supply cutoff number of the cylinders $N^*_{2CUT}$ set at the steps S12 and S14 is still continued to be set to a value corresponding to "two" cylinders. Hence, at the step S15, the former first target fuel supply cutoff number of the cylinders $N^*_{1CUT}$ is continued to be selected as the target fuel supply cutoff number of the cylinders $N^*_{CUT}$.

On the other hand, the decrease rate of the target sub throttle valve opening angle $\theta^*s(n)$ calculated at the step S8 dominated mainly by the average rear road wheel velocity $V_{WR}$ becomes gradually small before the decrease in the average rear road wheel velocity $V_{WR}$ and is changed to the increase rate in its negative value region at the time $t_{03}$ since the increase rate of the slip rate $S(n)$ becomes gradually small. However, since the actual sub throttle valve opening angle $\theta s$ limited by the predetermined opening angle $\theta s0$ and the actual fuel supply cutoff number of the cylinders $N^*_{CUT}$ is continued to be coincident with the target fuel supply cutoff number of the cylinders $N^*_{CUT}$ which indicates the selected first target fuel supply cutoff number of the cylinders $N^*_{1CUT}$. Therefore, the average rear road wheel velocity $V_{WR}$ is continued to be decreased due to the back torque of the engine and accordingly the average rear road wheel acceleration $V'_{WR}$ is, in turn, decreased in the negative value region thereof.

Hence, the first target fuel supply cutoff number of the cylinders $N^*_{1CUT}$ calculated at the step S10 and mainly dominated by the average rear road wheel acceleration $V'_{WR}$ gives the numerical value corresponding to "three" cylinders which is smaller than the "four" cylinders at a time $t_{04}$ at which the average rear road wheel acceleration $V'_{WR}$ indicates the negative value. The second target fuel supply cutoff number of the cylinders $N^*_{CUT}$ is continuously set to the numerical value corresponding to "two" cylinders. Thereafter, at the time $t_{04}$, the first fuel supply cutoff number of the cylinders $N^*_{1CUT}$ which indicates "three" cylinders is selected as the target fuel supply cutoff number of the cylinders $N^*_{CUT}$ so that the engine control unit 31 inputting $N^*_{CUT}$ makes coincidence of the actual fuel supply cutoff number of the cylinders $N_{CUT}$ with $N^*_{CUT}$ ("three" cylinders). On the other hand, the target sub throttle valve opening angle $\theta^*s(n)$ calculated at the step S8 and dominated mainly by the average rear road wheel velocity VWR is continued to be increased relatively largely in the negative value region thereof along with the decrease in the average rear road wheel velocity $V_{WR}$.

However, the actual sub throttle valve opening angle $\theta s$ remains limited by the predetermined opening angle $\theta s0$. During the duration from the time $t_{03}$ to the time $t_{04}$, the engine output is consumed only to slip the rear left and right road wheels 10RL and 10RR.

The average rear road wheel velocity $V_{WR}$ of the rear left and right road wheels 10RL and 10RR starts to approach to the driving force control start threshold $V_{W0}$.

However, its rotational inertia is not so stably converged as to drive the vehicle body and, consequently, the average front road wheel velocity $V_{WF}$ which is equivalent to the vehicle body speed is hardly increased.

Due to the back torque of the engine 20, the decrease rate of the average rear road wheel acceleration $V'_{WR}$ in the negative value region thereof becomes gradually small and, then, is changed to the increase rate in the negative value region. During this trajectory of the average rear road wheel acceleration $V'_{WR}$, the average rear road wheel acceleration $V'_{WR}$, the average rear road wheel velocity $V_{WR}$ is continued to be decreased. The first target fuel supply cutoff number of the cylinders $N_{1CUT}$ dominated mainly by the average rear road wheel acceleration $V'_{WR}$ fully gives the numerical value corresponding to zero cylinder at a time $t_{05}$ and the target sub throttle valve opening angle $\theta*s(n)$ is still below "0" Hence, the second target fuel supply cutoff number of the cylinders $N*_{2CUT}$ corresponding to "two" cylinders is continued to be set.

Consequently, at the step S5 of FIGS. 4A and 4B, the second target fuel supply cutoff number of the cylinders $N*_{2CUT}$ is selected to the target fuel supply cutoff number of the cylinders $N*_{CUT}$. The $N*_{CUT}$ inputted engine control unit 31 makes the coincidence of the actual fuel supply cutoff number of the cylinders $N*_{CUT}=N*_{2CUT}$)

Thereafter, the average rear road wheel velocity VWR is continuously decreased slowly according to the fuel supply cutoff to the actual fuel supply cutoff number of the cylinders $N_{CUT}$ (=$N*_{CUT}=N*_{2CUT}$). The average rear road wheel acceleration $V'_{WR}$ is continued to be increased slowly in the negative value region thereof. Consequently, since the first target fuel supply cutoff number of the cylinders $N*_{2CUT}$ corresponding to "two" cylinders is continued to be set to the target fuel supply cutoff number of the cylinders $N*_{CUT}$, the slip rate on the average rear road wheel velocity $V_{WR}$ is converged at a relatively earlier stage although the running road surface is the extremely low $\mu$ road surface.

The average rear road wheel velocity $V_{WR}$ approaching slowly to the driving force control start threshold $V_{W0}$ at a time near the time $t_{05}$ gives a value sufficient for the rear left and right road wheels 10RL and 10RR to grip the extremely low $\mu$ road surface to some degree since the rotational inertia becomes stably reduced. In addition, the vehicle body speed is moderately but gradually increased and accordingly the average front road wheel velocity $V_{WF}$ slowly starts to increase. Hence, since the average rear road wheel acceleration $V'_{WR}$ increasing in the negative region before the time $t_{05}$ drives the vehicle body supporting a sprung mass (vehicle body mass), the engine output torque is consumed to drive the vehicle body. Therefore, the average front road wheel velocity $V_{WF}$ equivalent to the vehicle body speed is acceleratedly increased (in the acceleration manner).

This causes the target fuel supply cutoff number of the cylinders $N*_{CUT}$ to continuously select the second target fuel supply cutoff number of the cylinders $N*_{2CUT}$ corresponding to "two" cylinders. The actual fuel supply cutoff number of the cylinders $N_{CUT}$ to continuously select the second target fuel supply cutoff number of the cylinders $N*_{2CUT}$. Although the reduction control for the engine torque is continued, the average front road wheel velocity $V_{WF}$ equivalent to the vehicle body speed is continued to be increased. Specifically, before a time $t_{06}$ at which the average front road wheel velocity $V_{WF}$ reaches the velocity corresponding to the driving force control start threshold $V_{W0}$, the deviation from the average rear road wheel velocity $V_{WR}$, i.e., the slip rate $S(n)$ is converged in a range of the steady state slip condition developed on the extremely low $\mu$ road surface. Hence, a decrease rate of the average rear road wheel velocity $V_{WR}$ is acceleratedly reduced at a time $t_{05}$. The average rear road wheel velocity $V_{WR}$ reaches its peak of decrease direction at a time $t_{06}$ at which the average rear road wheel acceleration $V'_{WR}$ gives zero and is thereafter changed to the increase rate.

Consequently, the deviation of the average rear road wheel velocity $V_{WR}$ with respect to the average front road wheel velocity $V_{WF}$, i.e., the slip rate $S(n)$ becomes reduced in the acceleration manner before the time $t_{06}$ and the target sub throttle valve opening angle $\theta*s(n)$ mainly dominated by the slip rate $S(n)$ is changed finally to the positive value at a time $t_{07}$. Hence, the routine of FIGS. 4A and 4B is transferred from the step S11 to the step S13 in which the second target fuel supply cutoff number of the cylinders $N*_{2CUT}$ is set to "zero" cylinder.

On the other hand, the first target fuel supply cutoff number of the cylinders $N_{1CUT}$ calculated at the step S10 is continued to be set to the numerical value corresponding to "zero" cylinder since the average rear road wheel acceleration $V'_{WR}$ is still continued to a small value and, hence, the target fuel supply cutoff number of the cylinders$N*_{CUT}$ indicates zero cylinder. Thus, the actual fuel supply cutoff number of the cylinders becomes coincident with $N*_{CUT}$ indicating zero cylinder. At this time, no back torque from the engine 20 occurs. On the contrary, a small engine torque is acted upon due to the leakage air quantity according to the actual sub throttle valve opening angle $\theta s$ limited by the predetermined opening angle $\theta_{s0}$ so that the average rear road wheel acceleration $V'_{WR}$ is increased in the region of the positive value and the average rear road wheel velocity $V_{WR}$ is started to increase slightly.

At this time duration and thereafter, the average front road wheel velocity $V_{WF}$ is continued to be increased. The slip rate $S(n)$ between the average front road wheel velocity $V_{WF}$ and the average rear road wheel velocity $V_{WR}$ becomes smaller so that the target sub throttle valve opening angle $\theta*s(n)$ calculated and set at the step S8 becomes approximately equal to or above the predetermined opening angle $\theta s0$ of the actual sub throttle valve opening angle $\theta s0$ at a time $t_{08}$. In addition, the target fuel cutoff number of the cylinders $N*_{CUT}$ and actual one $N_{CUT}$ are continued to indicate "zero" cylinder so that the engine output torque is gradually increased and the average rear road wheel acceleration $V'_{WR}$ is also increased. Consequently, the average rear road wheel velocity $V_{WR}$ is gradually increased. However, the slip rate $S(n)$ between the average front road wheel velocity $V_{WF}$ and the average rear road wheel velocity $V_{WR}$ is sufficiently converged into the range of the slip condition steadily developed in the case of the run on the extremely low $\mu$ road surface. Hence, the vehicle body speed is smoothly accelerated according to the increasing average rear road wheel acceleration $V'_{WR}$ and the average front road wheel velocity $V_{WF}$ is accordingly increased.

Thereafter, it is supposed that a stable acceleration of the vehicle on the extremely low $\mu$ road surface is continued.

As described above, although the driving force controlling apparatus in the embodiment, the non-driven (steered) road wheel velocity is used as the vehicle body speed, a pseudo vehicle speed may be retrieved using an anti-skid controlling apparatus in which the pseudo vehicle speed is calculated, the pseudo vehicle speed being converted into the road wheel velocity of the non-driven road wheel used as the vehicle body speed. Furthermore, although, in the embodiment, the driving force controlling apparatus according to the present invention has been described which is applicable to the rear road wheel drive vehicle (normally called, FR vehicle or RR vehicle), the present invention is also applicable to a front road wheel drive vehicle (normally called FF vehicle) or to a four wheel drive vehicle (normally called, 4WD vehicle). It is noted that since, in the case of the four wheel drive vehicle, the non-driven wheel is not present on principle, the pseudo vehicle speed may be calculated as the vehicle body speed as described above applying the anti-skid controlling apparatus.

What is claimed is:

1. An apparatus for controlling a driving force derived from an internal combustion engine to at least one driven road wheel of an automotive vehicle, comprising:

slip condition detecting means for detecting a slip condition of the driven road wheel;

adjusting means for adjusting an opening angle of an engine sub throttle valve installed in an engine intake air system independently of a main throttle valve associated with an engine accelerator in such a manner that the slip condition of the driven road wheel is controlled to fall in a predetermined condition;

target value calculating means for calculating a target opening angle of the sub throttle valve according to the detected slip condition;

opening angle detecting means for detecting the opening angle of the sub throttle valve;

a stopper for preventing the engine sub throttle valve from being closed completely during an engine idling condition;

steady state deviation deriving means for deriving a steady state deviation of an output of the engine developed due to a deviation between the target opening angle of the sub throttle value calculated by the target value calculating means and the actually detected opening angle thereof in accordance with the target opening angle of the sub throttle valve; and compensating means for compensating the derived steady state deviation using another driving force reducing means, said another driving force reducing means including controlling means for cutting off a fuel supply to at least one engine cylinder so as to reduce engine output.

2. A driving force controlling apparatus for an automotive vehicle having an internal combustion engine, comprising:

a first detector detecting a vehicle body speed as a predetermined target driven road wheel velocity;

a second detector detecting a driven road wheel velocity of a driven road wheel of the vehicle;

a first control unit determining a slip condition of the driven road wheel velocity of a driven road wheel velocity of a driven road wheel of the vehicle;

a second control unit controlling an opening angle of a sub throttle valve installed independently of a main throttle valve in an intake air system of the engine, said main throttle valve being operable by a vehicle driver through an accelerator, in a close direction thereof according to a magnitude of a determined value of the slip condition of the driven road wheel so as to reduce an engine output, said second control unit deriving a target opening angle of said sub throttle valve according to a magnitude of a determined value of the slip condition of the driven road wheel so as to reduce an engine output;

a stopper, said stopper being installed in an intake air system and preventing the sub throttle valve from being closed completely during an engine idling condition; and a third control unit cutting off a fuel supply to at least one of the engine cylinders so as to reduce the engine output, said third control unit setting a number of engine cylinders for the fuel supply to be cut off according to a steady state deviation of the engine output developed due to a deviation between the target opening angle of the sub throttle valve derived by the second control unit and an actual opening angle of the sub throttle valve in accordance with the target opening angle of the sub throttle valve, said steady state deviation being developed due to the installation of the stopper in the intake air passage.

3. A driving force controlling apparatus for an automotive vehicle having an internal combustion engine as claimed in claim 2, wherein, when said second control unit outputs a full close command signal toward said sub throttle valve to fully close the sub throttle valve, said full close command signal corresponding to a full close target opening angle of the sub throttle valve, said third control unit sets the number of the cylinders for the fuel supply to be cut off which are in accordance with the steady state deviation.

4. A driving force controlling apparatus for an automotive vehicle having an internal combustion engine as claimed in claim 3, wherein said first detector comprises a plurality of first sensors, each first sensor detecting a road wheel rotation speed of a corresponding non-driven road wheel, said second detector comprises a plurality of second sensors, each second sensor detecting the road wheel rotation speed of a corresponding driven road wheel, said first control unit calculates an average non-driven road wheel velocity of the non-driven road wheels as a vehicle body speed as follows: $V_{WF}=(V_{WFL}+V_{WFR})/2$, calculates an average driven road wheel velocity of the driven road wheels as the driven road wheel velocity as follows: $V_{WR}=(V_{WL+VRR})/2$, and calculates the present value S(n) of the slip condition of the driven road wheels as follows: $S(n)=V_{WR}-V_{WF}$.

5. A driving force controlling apparatus for an automotive vehicle having an internal combustion engine as claimed in claim 4, wherein said second control unit calculates the present value $\theta^*s(n)$ of the target opening angle of the sub throttle valve using the present value S(n) of the slip condition, a previous value S(n-1) of the slip condition, and a previous value $\theta^*s(n-1)$ of the target sub throttle valve opening angle: $\theta^*s(n)=\theta^*s(n-1)-KI\cdot S(n)-Kp1\cdot(S(n)-S(n-1))$, wherein KI denotes an integration gain of control and KP1 denotes a proportional gain of control, and determines the present value $\theta^*s(n)$ of the target opening angle of the sub throttle valve as follows: $\theta^*s(n)=MIN(\theta^*s(n), \theta^*_{SMAX})$, wherein MIN denotes a selection of a minimum value from $(\theta^*s(n), \theta^*_{SMAX})$ and $\theta^*_{SMAX}$ denotes a maximum value (100%) of the opening angle of the sub throttle valve.

6. A driving force controlling apparatus for an automotive vehicle having an internal combustion engine as claimed in claim 5, wherein a full close stopper is installed in a vicinity of the sub throttle valve so that a leakage air quantity is produced when the sub throttle valve becomes fully closed in response to the full close command signal and wherein said third control unit calculates a first target number of the engine cylinders N*CUT using the present value S(n) of the slip condition and its differentiated value dS(n)/dt in accordance with the following equation: $N^*_{1CUT}=INT(K_{p2}\cdot S(n)+K_D\cdot(S(n)/dt))$, wherein $K_{P2}$ denotes a proportional gain, $K_D$ denotes a differential gain, and INT denotes an integer of ($K_{p2} \cdot S(n) + K_D \cdot (S(n)/dt)$) and determines whether the present value $\theta^*S(n)$ of the target opening angle of the sub throttle valve is equal to or below zero, calculates the steady state deviation $\Delta E_{T2}$ as follows when the present value $S^*(n)$ is equal to or below zero; $\Delta E_{T2} = E_1 - E_0$, wherein $E_1$ denotes an engine torque derived when the sub throttle valve becomes fully closed and $E_0$ denotes an engine torque supposed if the sub throttle valve would presumably be fully closed, calculates a second target number of the engine cylinders $N^*_{2CUT}$ as follows: $N^*_{2CUT} = f_2(\Delta E_{T2})$, wherein $f_2$ denotes a torque down function of $\Delta E_{T2}$ as a factor, and determines a target number of the engine cylinders $N^*_{CUT}$ for the fuel supply to be cut off as follows: $N^*_{CUT} = MAX(N^*_{1CUT}, N2^*_{CUT})$, wherein MAX denotes a selection of a maximum value from ($N^*_{1CUT}, N2^*_{CUT}$).

7. A driving force controlling apparatus for an automotive vehicle having an internal combustion engine as claimed in claim 6, which further comprises an engine control unit, an actuator arranged for actuating said sub throttle valve in response to a drive signal from said second control unit, and a plurality of fuel injectors, each being installed for a corresponding one of the engine cylinders so as to inject a fuel quantity determined by the engine control unit to the corresponding one of the engine cylinders in response to a pulse signal from the engine control unit, wherein said engine control unit halts the fuel supply to any one or more of the engine cylinders according to the target number of the cylinders for the fuel supply to be cut off $N^*_{CUT}$ determined by the third control unit, and wherein said engine control unit outputs the drive signal to said actuator so that the sub throttle valve is at the position according to the present value $\theta^*s(n)$ of the target opening angle of the sub throttle valve.

8. A driving force controlling apparatus for an automotive vehicle having an internal combustion engine as claimed in claim 5, wherein the integration gain of control $K_I$, is set to a relatively large value and proportional gain $K_{p1}$ of control is set to a relatively small value.

9. A driving force controlling apparatus for an automotive vehicle having an internal combustion engine as claimed in claim 6, wherein the differential gain of control $K_D$ is set to a relatively large value and the proportional gain $K_{P2}$ of control is set to a relatively small value.

10. A driving force controlling apparatus for an automotive vehicle having an internal combustion engine as claimed in claim 6, wherein said third control unit set $N^*_{2CUT}$ to zero when $\theta^*s(n) > 0$ and does not calculate the steady state deviation $\Delta E_{T2}$.

11. A driving force controlling apparatus for an automotive vehicle having an internal combustion engine as claimed in claim 10, wherein said first control unit further determines whether the average rear road wheel velocity $V_{WR}$ is equal to or above a deriving force control start threshold value $V_{W0}$ which is derived according to the average front road wheel velocity $V_{WF}$ and wherein $V_{WR} \geq V_{W0}$, said first control unit calculates $S^*(n)$.

12. A method for controlling a driving force derived from an internal combustion engine to at least one driven road wheel of an automotive vehicle, comprising:

a) detecting a slip condition of the driven road wheel;

b) adjusting an opening angle of an engine sub throttle valve installed in an engine intake air system independently of a main throttle valve associated with an engine accelerator in such a manner that the slip condition of the driven road wheel is controlled to fall in a predetermined condition;

c) calculating a target opening angle of the sub throttle valve according to the detected slip condition;

d) detecting the opening angle of the sub throttle valve;

e) deriving a steady state deviation of an output of the engine developed due to a deviation between the target opening angle of the sub throttle valve and the actually detected opening angle thereof;

f) compensating the derived steady state deviation using another driving force reducing means; and g) preventing the engine sub throttle valve from being closed completely during an engine idling condition.

13. An apparatus for controlling a driving force derived from an internal combustion engine to at least one driven road wheel of an automotive vehicle, comprising:

a slip condition detector detecting a slip condition of the driven road wheel;

an adjuster adjusting an opening angle of an engine sub throttle valve installed in an engine intake air system independently of a main throttle valve associated with an engine accelerator in such a manner that the slip condition of the driven road wheel is controlled to fall in a predetermined condition;

a stopper, the stopper being installed in the intake air passage of the engine and preventing the sub throttle valve from being closed completely during an engine driving condition;

a target value calculator calculating a target opening angle of the sub throttle valve according to the detected slip condition;

an opening angle detector detecting the opening angle of the sub throttle valve;

a steady state deviation deriver deriving a steady state deviation of an output of the engine developed due to a deviation between the target opening angle of the sub throttle valve calculated by the target value calculator and the actually detected opening angle thereof in accordance with the target opening angle of the sub throttle valve, the steady state deviation being developed due to the installation of the stopper in the intake air passage; and a compensator compensating the derived steady state deviation using another driving force reducing controller, said compensator including a controller cutting off a fuel supply to at least one engine cylinder so as to reduce the engine output.

* * * * *